March 27, 1951  H. T. AVERY  2,546,881
CONTROL SYSTEM FOR ROTATING WING AIRCRAFT
Filed Nov. 26, 1945  5 Sheets-Sheet 2
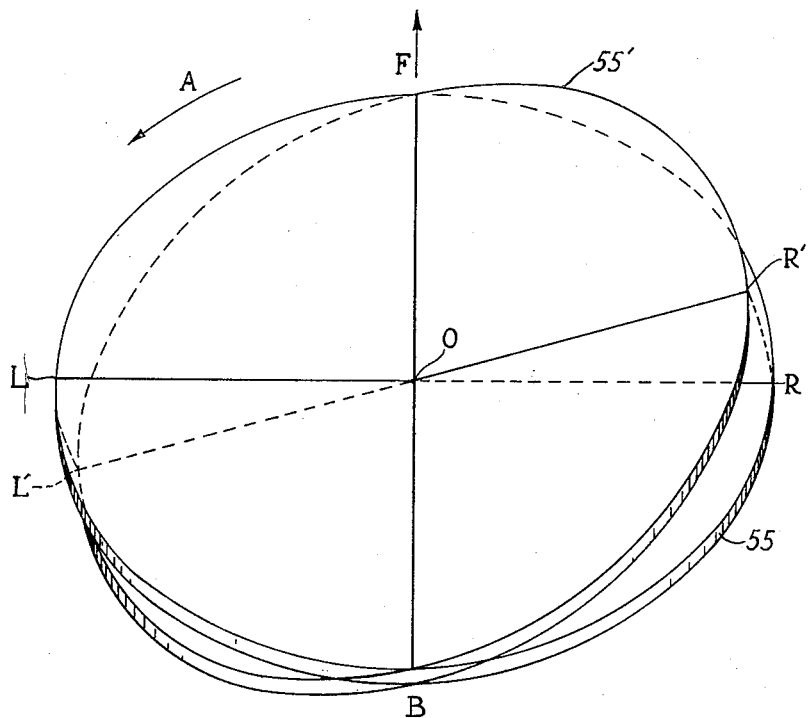
FIG_2_
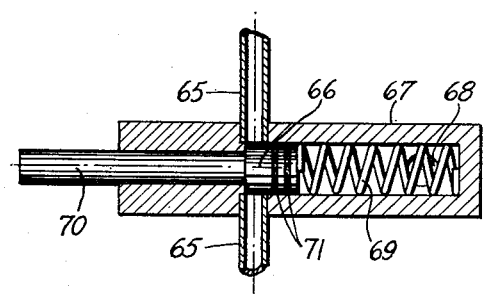
FIG_4_
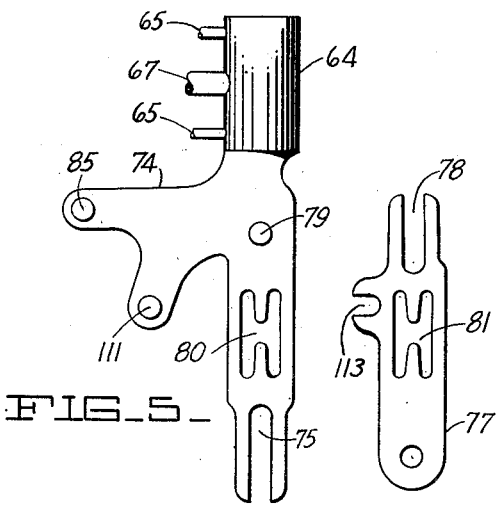
FIG_5_  FIG_6_
INVENTOR.
Harold T. Avery
BY
ATTORNEYS

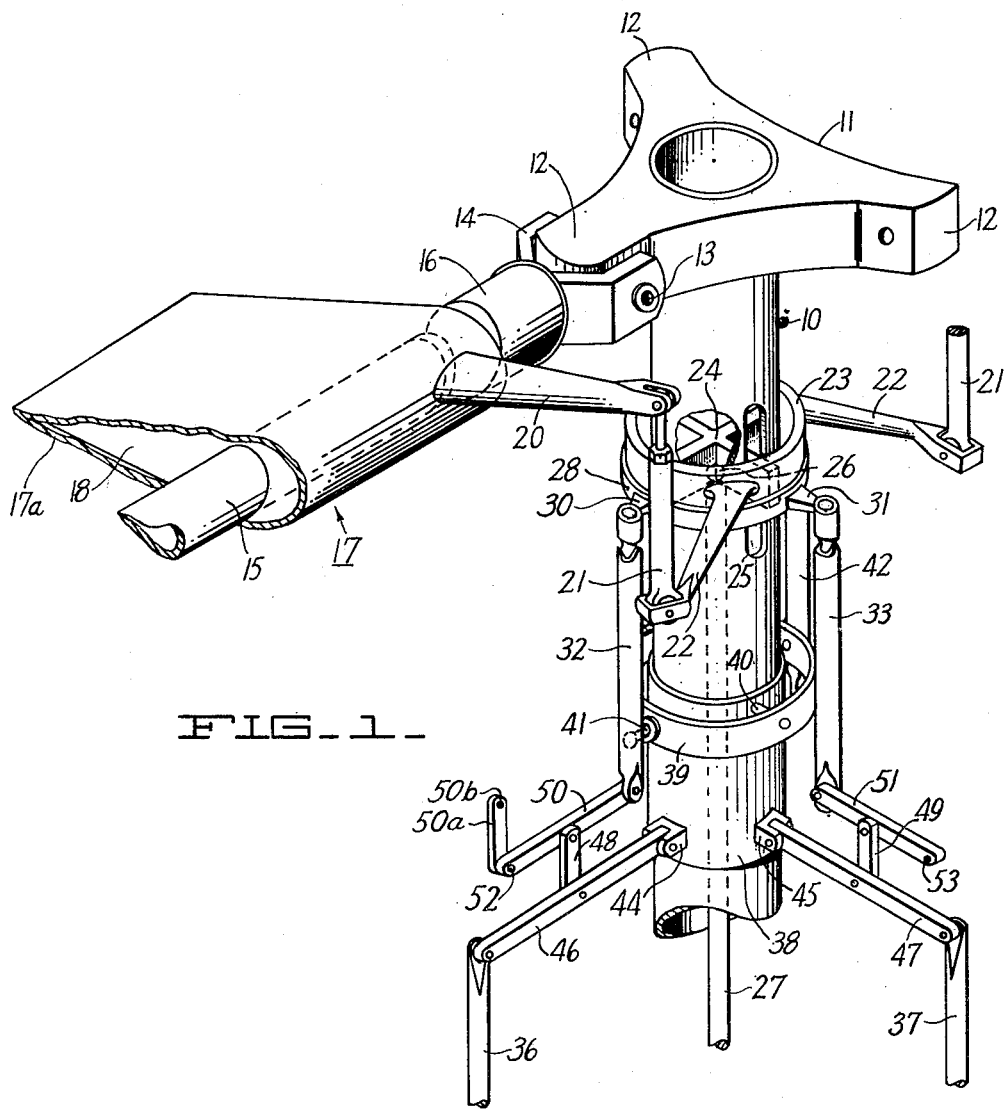

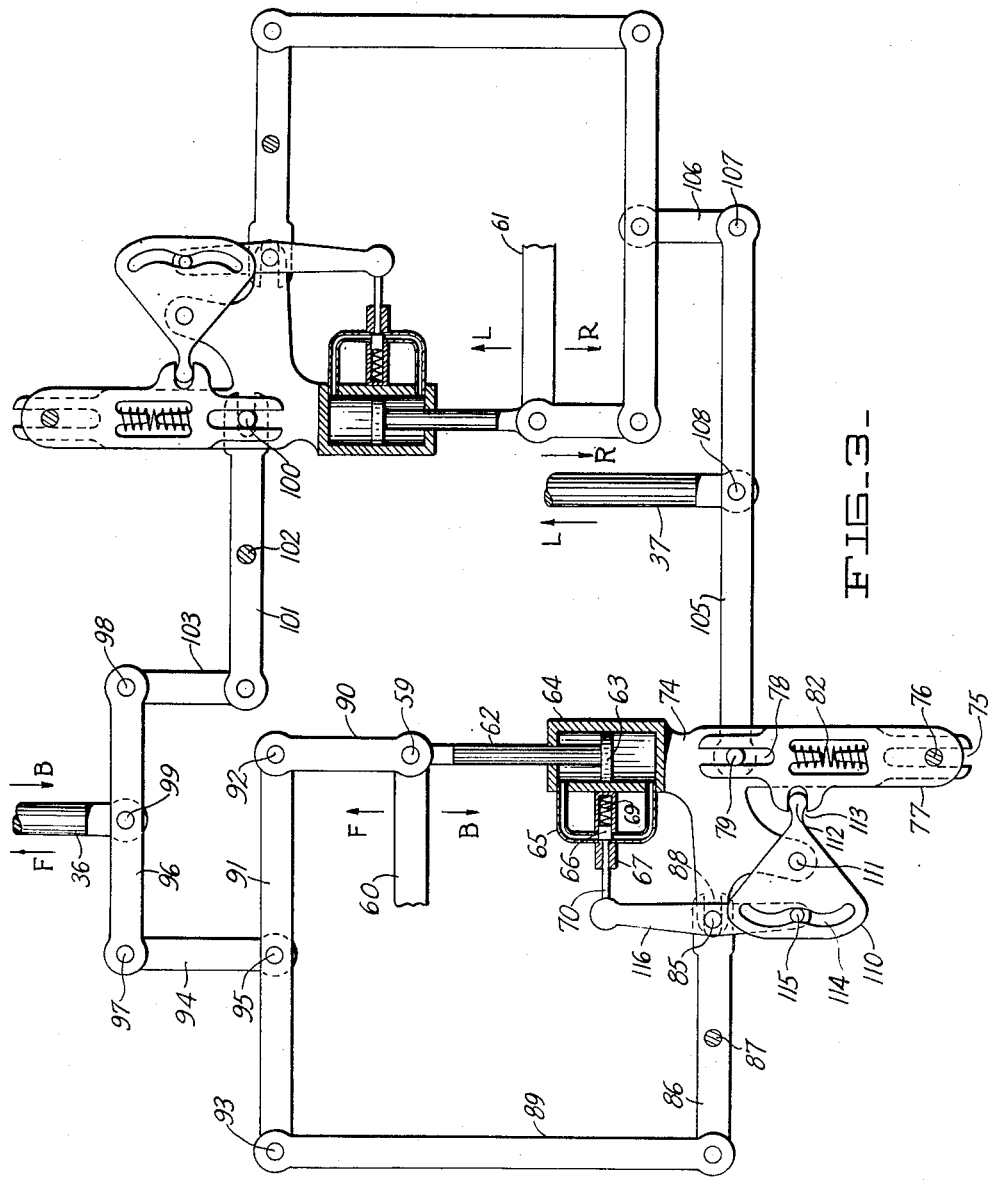

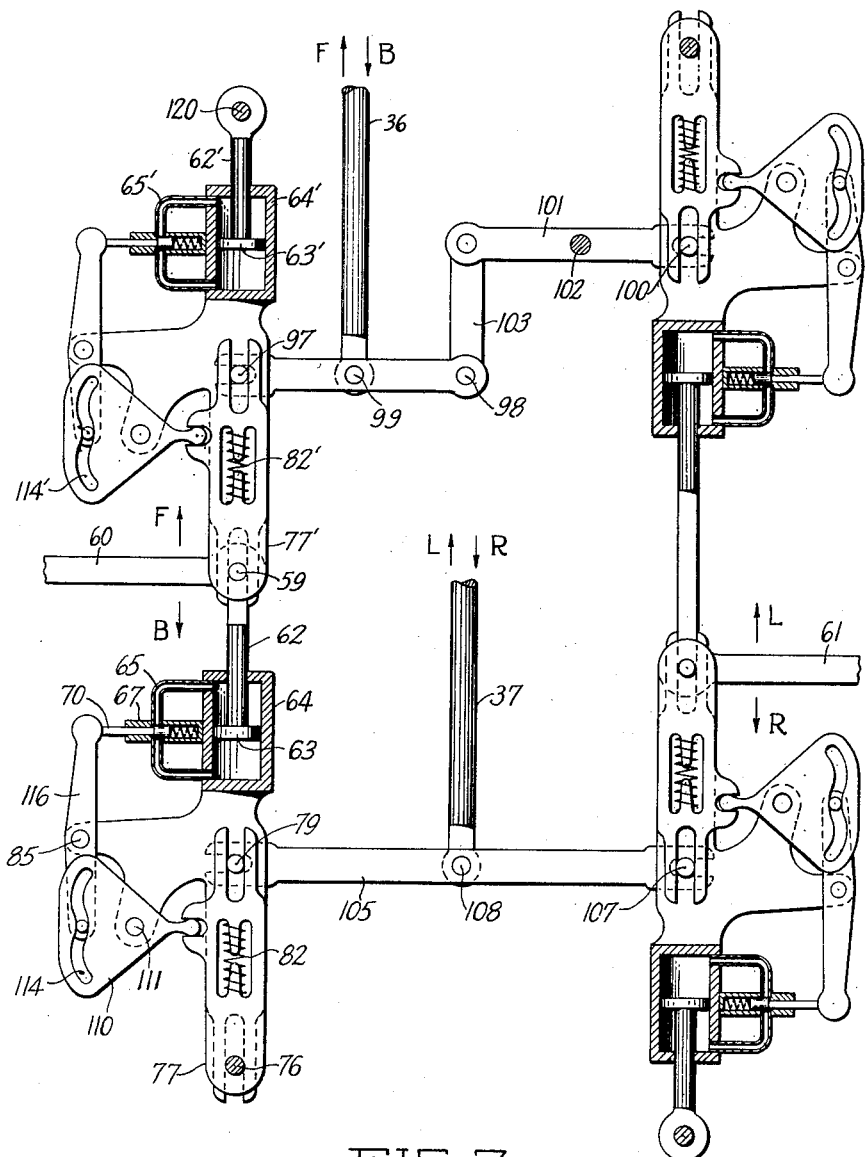
FIG_7_

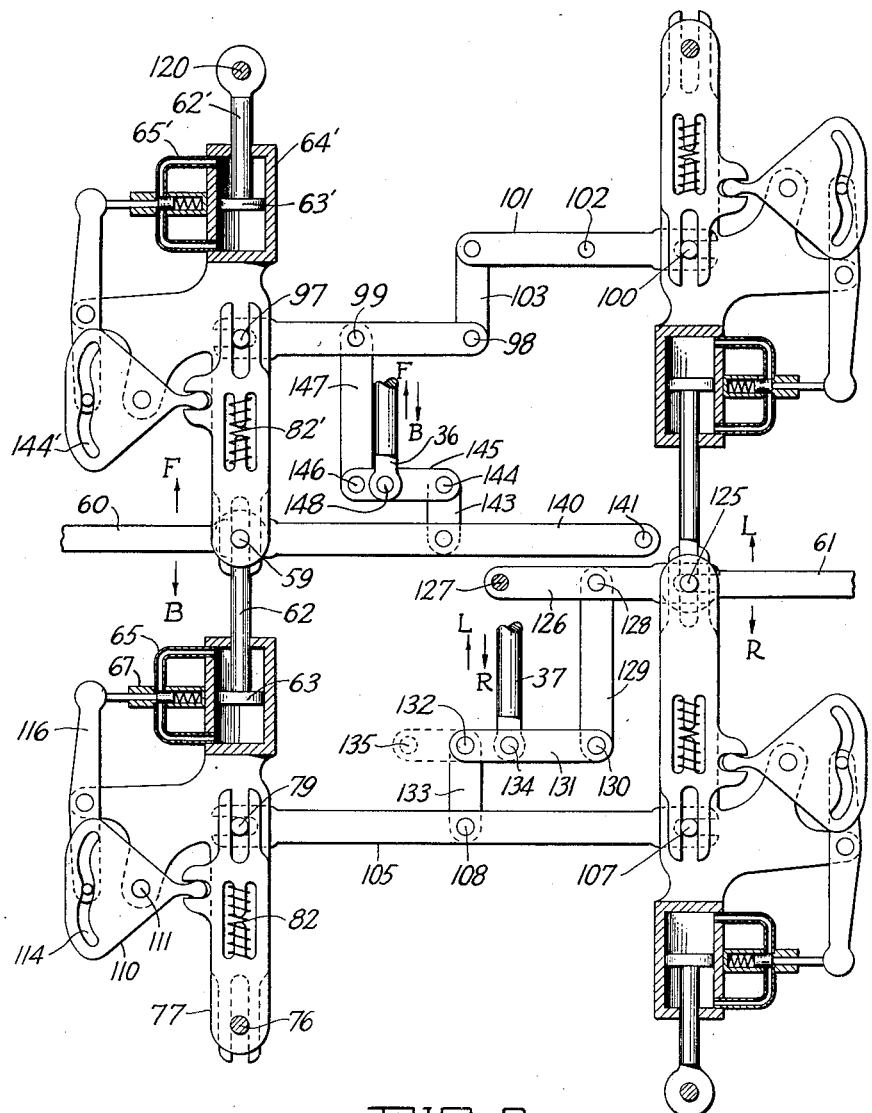
FIG_8_

Patented Mar. 27, 1951

2,546,881

UNITED STATES PATENT OFFICE 2,546,881

CONTROL SYSTEM FOR ROTATING WING AIRCRAFT

Harold T. Avery, Oakland, Calif.

Application November 26, 1945, Serial No. 630,745

3 Claims. (Cl. 170—160.25)

This invention relates to control means for rotating wing aircraft. It is particularly useful in a craft such as an Autogiro or helicopter sustained by a rotor having articulated blades.

In such a craft the controls which effect the lateral and longitudinal movement of the craft must be operated quite slowly in order to avoid what is frequently referred to as a "gyroscopic effect," namely, a response of the craft at right angles to the response normally associated with the control applied. As will be discussed later, this is not a true gyroscopic effect, but is so designated because it is similar to a gyroscopic effect in that the response is at right angles to the direction of response normally expected.

Because of this peculiar behavior which the craft exhibits if a control is quickly applied, it is the usual practice to make all controlling movements relatively slowly. This greatly increases the care and skill required to properly operate the craft, and renders it impossible to control the craft automatically by the same kind of apparatus used for the automatic control of airplanes; for such apparatus must respond rather quickly to displacements of the craft if its performance is to be satisfactory.

A principal object of the invention is to reduce the skill and training necessary for the operation of rotating wing aircraft by providing a control system for such aircraft in which the direction of response of the craft to a given control adjustment does not vary, regardless of the rate at which such adjustment is effected.

A further principal object of the invention is to make possible the automatic control of rotating wing aircraft by apparatus of the same general kind heretofore used for the automatic control of airplanes, by providing a system capable of giving a uniform direction of response to control adjustments and giving such a response at rates comparable with the rates at which such apparatus is capable of effecting such adjustments.

Other objects include the general improvement of control means for rotating wing aircraft and, in particular, the provision of improved means for controlling the pitch of the respective blades of the rotor of such a craft.

The manner in which the foregoing, together with additional objects and advantages of the invention, are attained will be made apparent in the course of the following description of the preferred embodiments thereof which is to be read with reference to the accompanying drawings, in which:

Figure 1 is a schematic view in perspective showing a portion of the rotor of a craft embodying my invention, particularly the rotor hub and driving shaft, a portion of a typical blade and the means for controlling the pitch of the blades, several of the parts being partially broken away in order to better expose other parts to view;

Figure 2 is a diagrammatic view in perspective of the planes and paths of movement of a blade element under different conditions of operation;

Figure 3 is a diagrammatic view of the mechanism for distributing control movements to the rotor in a novel manner and for regulating the rate at which these movements are applied to the rotor;

Figures 4, 5 and 6 are detailed views of certain parts of the mechanism shown in Figure 3;

Figure 7 is a diagrammatic view of an alternative and further improved form of the mechanism illustrated in Figure 3;

Figure 8 is a diagrammatic view of a second alternative form of the mechanism illustrated in Figure 7.

The foregoing, together with other objects and advantages of my invention, are accomplished in the specific embodiments illustrated and described in this specification by an arrangement which is effective upon sudden adjustment of a control member to first impart to the pitch control elements a transient adjustment which is angularly offset from their final adjustment in such a direction and by such an amount, that the immediate effect produced by the transient adjustment will be exerted in the same direction as the final effect normally associated with the control applied. Thereafter the transient adjustment thus effected is automatically reduced to zero at a controlled rate corresponding to the rate at which the gyroscopic effect deteriorates, while simultaneously the final adjustment is gradually imparted to the pitch control elements at a controlled rate, so that the response of the craft is continuously in the desired direction throughout both the transient and final adjustments of the pitch controls.

In connection with the attainment of the principal objects of the invention by the means outlined above, I have also provided an improved means for controlling the pitch of the respective blades of the rotor of such a craft, and a specific embodiment of this feature of my invention will be first described.

The arrangement shown in Figure 1 for transmitting the drive and pitch control movements to the rotor blades corresponds in general to that of the NX-1272 helicopter illustrated and described in an article in "Aviation" for June 1945 at pages 122 to 130, to which article reference may be had for details of construction previously known in the art and therefore not disclosed herein. A rotor drive tube 10 is adapted to be driven in a counterclockwise direction by an engine mounted in the fuselage of the craft. Integrally attached to the upper end of the shaft 10 is a hub member 11 which, in the particular form illustrated, has three arms 12 to each of which a blade such as the blade 17 is pivotally attached by a substantially horizontal hinge 13, only one of the three hinges and blades being shown in the drawing, however. Each blade 17 includes a blade root member 14 which is pivotally attached to the hub member 11 by a hinge 13 and is pivotally connected to a blade spar 15 by a pivotal mounting 16, which permits each spar 15 to be rocked on its own axis relative to the root member 14 to change the pitch of the blade. The blade shell 17a is integrally attached to spar 15 by means of ribs 18. This constitutes what is generally termed an articulated rotor. Optionally each blade may also be equipped with a generally vertical drag hinge (not shown) and/or other cushioning means between the engine and the blades, but the presence of any or all of such hinges and means does not appreciably alter the functioning of the novel mechanism in the craft.

Control means are provided which, by selective adjustment, may cause either simultaneous and equal change of pitch of all blades or may cause the pitch of each blade to be cyclically increased and decreased as the rotor rotates, the angular location and magnitude of such cyclic changes being dependent upon the direction and magnitude of movement, respectively, of elements of the control means.

This control means comprises a pitch control arm 20 integral with each blade 17 and pivotally connected for universal movement to the upper end of a pitch control link 21. The lower end of each link 21 is pivotally connected for universal movement to one of three arms 22 of a pitch control spider 23. Integral with spider 23 are cross members 24 which extend inwardly through slots 25 in the rotor drive tube 10 and are pivotally supported by a ball 26 on the upper end of a pitch control rod 27; this arrangement being such that spider 23 is constrained to rotate with shaft 10. Through a thrust bearing mounting of the general character disclosed in the article previously referred to, spider 23 is connected to a non-rotating ring 28; the arrangement being such that spider 23 and ring 28 may be tipped as a unit in any direction by control movements imparted to ring 28. Integral with the ring 28 at two positions, preferably 90° removed from each other, are two arms 30 and 31 which are universally connected to two control rods 32 and 33, respectively, which control rods are subject to displacement in a substantially vertical direction in a manner to be hereinafter described. Vertical movement of control rods 32 and 33 may thus be utilized to effect tilting of ring 28 in any desired direction.

Spider 23 and ring 28 also may be raised or lowered as a whole, without altering their tilt, by raising or lowering the pitch control rod 27 upon which they are universally mounted by means of the ball 26, and manually adjustable means (not shown) are provided for vertically positioning rod 27. Such raising or lowering will correspondingly increase or decrease the pitch of all blades; the movement of the pitch control rod 27 introducing a simultaneous and substantially identical change of pitch to all blades; and links 32 and 33 being constrained to move up and down in unison with rod 27 by mechanism which will be described presently.

Any vertical movement of either or both of the control rods 32 and 33 relative to the pitch control rod 27 will, however, cause a change in the tilt of spider 28 and ring 23 and hence a change in the cyclic pattern of pitch distribution, for if the spider and ring are not perpendicular to shaft 10, they will cause the pitch of each blade to be cyclically increased and decreased as the rotor rotates, the angular location of these cyclic changes depending upon the direction of tilt of the spider and ring and the amount of the cyclic changes depending upon the amount of tilt of the spider and ring.

These cyclic changes of pitch of the blades tend to bring about a tilt in the effective plane of rotation of the rotor (without tilting the rotor hub), but the direction of such rotor tilt is, in general, not the same as the direction of spider tilt due to the angle subtended in the plane of rotation between the positions thereon of each arm 22 and its corresponding blade spar 15 and to such effects as that of blade inertia in displacing the rotational position of the blade at the instant of maximum response from its position at the instant of effecting the adjustment causing the response. Nevertheless there is a definite relationship between the direction of tilt of the spider 28 and ring 23 and the direction of tilt that the effective plane of rotation of the rotor eventually tends to assume as a result thereof.

A feature of my invention is the provision of novel means whereby control rods 32 and 33 are constrained to move vertically in synchronism with the pitch control rod 27 whenever a general increase or decrease of pitch is to be effected by the latter without changing the tilt of the pitch control spider 23; the arrangement being such as will nevertheless permit independent movement of the control rods 32 and 33 with respect to the pitch control rod 27 for the purpose of changing the tilt of the pitch control spider 23. To provide for this, rod 32 is connected to a tilt-control rod 36, as well as to rod 27, in such a manner that the vertical displacements of rod 32 will be equal to those of rod 27, plus displacements equal or proportional to those of the tilt control rod 36. Rod 33 is similarly connected to rod 27 and a second tilt control rod 37. Hence each vertical position of rod 36 relative to the craft causes rod 32 to assume a corresponding vertical position relative to the pitch control rod 27 and hence to introduce to ring 28 and spider 23 a certain component of tilt which is maintained unchanged as long as tilt control rod 36 is held stationary, regardless of the vertical movement that may be imparted to the ring and spider by pitch control rod 27 or the change in tilt about the coordinate axis that may be imparted to the rings by the second tilt control rod 37. The second tilt control rod 37, in turn, is connected to the ring and spider in a similar manner to give a similar result with respect to its own axis of tilt.

The novel mechanism for connecting rod 32 to rods 36 and 27 so that it will respond in the manner above described includes a sleeve 38 slidably mounted on tube 10, but restrained from rotating therewith. In order to constrain sleeve 38 to move vertically in unison with rod 27, it is pivotally connected to a ring 39 by two coaxial pivot pins 40 (only one of these pins being visible in the drawing). At a point 90° removed from pins 40, an arm 41 integral with the ring 39 is pivotally connected to the rod 32. Another rod 42 directly on the opposite side of tube 10 from rod 32, is similarly connected to rings 28 and 39. Although ring 39 will not in general be maintained parallel to ring 28, the diameter of ring 39 which is pivotally connected to rods 32 and 42 will be maintained parallel to and at a fixed vertical distance from the diameter of ring 28 to which these links are pivotally attached and hence at a constant average height relative to rod 27, hence constraining the axis of pins 40, which intersects this diameter at its mid-point, to intersect the axis of rod 27 at a fixed point in the rod. Hence as rod 27 is moved up or down sleeve 38 moves correspondingly in unchanging vertical relationship to rod 27, even though separated from it by the walls of the rotating tube 10. Pivotally attached to the sleeve 38 by brackets 44 and 45, respectively, are levers 46 and 47, the outer ends of which are pivotally attached to the tilt control rods 36 and 37, respectively. The mid-points of these two levers are connected by normally vertical links 48 and 49, respectively, to the mid-points of levers 50 and 51, respectively, the inner ends of which levers are pivotally connected to rods 32 and 33, respectively. The outer end of lever 51 is pivotally mounted at 53 on a pin fixed in the framework of the craft, while the outer end of lever 50 is pivotally connected to a link 50a pivotally mounted at 50b on a pin fixed in the framework of the craft.

This mechanism is therefore such that if with tilt control rods 36 and 37 held fixed, pitch control rod 27 be raised or lowered, sleeve 38 and the inner ends of levers 46 and 47 will be raised or lowered by an identical amount, which through links 48 and 49 will cause the mid-points of levers 50 and 51 to be raised or lowered by half this amount, which levers rocking about their fixed pivots 52 and 53 will cause rods 32 and 33 to be raised or lowered by the same amount as rod 27. On the other hand, if with pitch control rod 27 held stationary, tilt control rod 36 or 37 is raised or lowered, the mid-point of the corresponding lever 50 or 51 will be raised or lowered by half as much, thereby causing the corresponding rod 32 or 33 to be raised or lowered by the same amount as the tilt control rod 36 or 37 which was moved.

In order that pitch control rod 27 may raise or lower rings 23 and 28 without tilting them, it is essential that vertical movement of rod 27 shall cause identical vertical movement of rods 32 and 33. Also, the movement imparted to these rods by tilt control rods 36 and 37 should be related to, but not necessarily identical with that of the latter rods. Therefore, if for any reason it should prove desirable to have anything other than a 1:1 ratio of movement between the respective rods 36 and 37 and their respectively associated rods 32 and 33, links 48 and 49 may be attached at points further in or out than the mid-points of their respective levers, so long as the rod is attached the same fractional distance out on each of the levers to which it is attached so as to maintain a 1:1 ratio of movement between rod 27 and the rods 32 and 33.

It is apparent that the above described mechanism will function so that regardless of the average pitch of the blades as determined by the position of the pitch control rod 27, there will be a specific vertical position of tilt control rod 36 which will bring the diameter of ring 28 which it controls into a position perpendicular to the axis of shaft 10, and that displacement of rod 36 in one direction from this position will cause tilt of the ring in one direction, while displacement therefrom in the other direction will cause tilt in the other direction; and that the positioning of tilt control rod 37 similarly controls the tilting of the ring in directions perpendicular thereto.

This tilting will control the cyclic pitch in any desired manner in view of the fact that these two components of tilt may be combined to give any desired direction and amount of tilt to the ring and that when the ring is held perpendicular to shaft 10 all blades are maintained at uniform pitch settings throughout their rotation, while when the ring is tilted the pitch of each blade is cyclically increased and decreased as it rotates, the cyclic time of each increase and decrease depending upon the direction of tilt and the amount of increase and decrease depending upon the extent of tilt. The entire arrangement may, for instance, be so oriented in the craft that tilt control rod 36 will control the tilting that effects forward and backward movement of the craft and tilt conrol rod 37 control the tilting which effects lateral movement thereof.

In addition to various types of articulated rotors, another type of rotor is known in the art as the non-articulated rotor. In this latter type of rotor the blade axis (the axis of spar 15) is held in fixed relation to the drive tube 10, even though rotation of the blade about such fixed axis for pitch adjustment be permitted. The articulated rotor constructions, including those in which the blades as a group have a common articulated connection with the drive shaft as well as those in which the blades have individual articulated connections therewith, provide many advantages not present in craft sustained by non-articulated rotors. These advantages include minimizing of bending forces in the blades, particularly near the roots thereof, a minimizing of the resistance to blade pitch adjustment, a decrease in the transmission of air disturbances to the craft in flight, and a greater automatic inherent self-adjustment of the rotor to various flight conditions. In addition, if the pitch control link 21 is located outboard of the flapping hinge 13, the flapping movement may be utilized to effect an automatic lowering of blade pitch into the autorotational zone upon engine failure, as well as to effect an automatic adjustment of blade pitch in operation that tends to still further smooth out rotor and craft operation. However, as previously indicated, the articulated rotor has the inherent disadvantage that movements of the cyclic pitch control mechanism do not quickly produce a corresponding response of the rotor and of the craft.

Certain of the reasons which I consider give rise to this lagging of the response will now be explained with reference to Figure 2 which shows in perspective two discs, a horizontal disc 55 and a similar disc 55' tilted leftward therefrom along the common diameter BF. Assuming the center O of these two discs to be on the axis of rotor tube 10, then if the craft is in steady stationary hovering flight each blade element will travel in a horizontal circle about this axis, which in the case of a symmetrically loaded craft will be standing vertically under these circumstances.

The outer circumference of disc 55 therefore represents the path of such a blade element, and the resultant of the lift forces exerted by it and by all the other blade elements is a vertical force along the axis of tube 10.

If it is desired to cause any horizontal movement of the craft, this disc 55 (that is, the plane of movement of the blade element) must be tilted so that its resultant lift, instead of being vertical, will have a component in the desired direction. For instance, assuming that BF is a line parallel to the longitudinal axis of the craft, F being in the forward direction and B in the backward direction, then to produce leftward movement of the craft it would be necessary to cause the plane of rotation to tilt leftward, as for instance into the position indicated by disc 55'. When operating in the original hovering condition, some chord of the blade element (the particular chord depending upon the particular pitch setting of the blade) will lie in the plane of disc 55 and remain in the plane of that disc as the blade revolves. If the same average pitch setting is maintained after the plane of rotation is tilted to that of disc 55', this same chord will move into the plane of disc 55'. Therefore, assuming counterclockwise rotation of the rotor, as indicated by arrow A, we note that when the blade is straight backward in position B, the blade pitch (as referred to the horizontal disc 55) will be greater than it was during hovering condition by the angle between the two discs, since the chord line of the blade element which previously lay in the plane of disc 55 is now rotated to lie in the plane of disc 55'. However, when the blade is extending perpendicularly toward the right, bringing the blade element into the position R of disc 55 or the position R' of disc 55', no change of pitch is involved, for the tangents to the circumferences of the two discs are parallel at this point. When the blade is extending straight forward into the position F, the blade element will have a decrease in pitch (as referred to its original plane of rotation) equal to the increase in pitch encountered at B, while when the blade is extending leftward into the position L', there will be no change of pitch, for here again the tangents to the circumferences of the two discs are parallel.

Neglecting the effect of relative lateral wind, which in the case of free flight will develop very gradually in response to a change from a hovering condition to a condition involving leftward tilt of the rotor, if it is desired to bring the blade element from tracking in the circumference of disc 55 to tracking in the circumference of disc 55', it will be necessary to impose on the blade element cyclic changes in pitch in accordance with the changes above noted (namely, maximum increase in pitch at B, no change at R, maximum decrease at F, and no change at L), for only with such a pattern of pitch change can the blade chord which originally lay continuously in the plane of disc 55 come to lie continuously in the plane of disc 55', hence eliminating any tendency for the blade to depart from this plane of rotation.

As has been previously mentioned, if pitch control arm 20 of a blade (see Figure 1) is pivotally attached to pitch control link 21 outboard of the flapping hinge 13, then changes in flapping angle effect changes in blade pitch. Since changes in flapping angle are involved in the transition from the hovering condition represented by disc 55 to the left tilt condition represented by disc 55', the particular positions of the controls which will give the proper final pattern of blade pitch will not give that same pattern prior to the tilting of the rotor disc into its final position unless the pivotal connection of the pitch control arm 20 to the pitch control link 21 is substantially in line with the flapping hinge 13. However, it is simpler to study the case wherein the pivotal connection of the pitch control linkage is in line with the flapping hinge and the blade pitch pattern imposed by the controls remains fixed for a given position of the controls in spite of subsequent blade movements than it is to study the case wherein the blade pitch pattern is a function of both the control setting and the instant blade positions. We will therefore first consider this simpler case and then later the case wherein the tilt of the rotor alters blade pitch pattern even though the pitch controls are held fixed.

Assuming then the construction wherein the cyclic pattern of blade pitch is a direct and sole function of the tilt of spider 23, let it be assumed that we move the controls thereby causing this spider 23 to tilt in the manner adapted to impose on the rotor the pattern of blade pitch above described as being the pattern normally associated with the leftwardly tilted disc 55' (Figure 2). If such a pattern of cyclic change of pitch be suddenly imposed upon the blades when they are revolving in the plane of disc 55, any blade located in the rear half of the disc will tend to climb upward about its flapping hinge and any blade located in the forward half of the disc to drop downward about its hinge, for the increase of pitch will commence to be applied as the blade passes rearward through point L, reaching a maximum at B and ceasing at R, while the decrease of pitch will be applied to a blade as it passes forward through R, reaching a maximum at F and ceasing at L. Therefore, a blade which was just passing rearwardly through L at the time that the controls were set to impose the new pattern of pitch distribution would have imparted to it an increasing tendency to climb throughout its travel from L to B and would have climbed considerably by the time it reached B; the actual amount of climb depending upon the mass and mass distribution of the blade and upon the amount and distribution of the lift forces set up by the change of pitch. Thus there is an immediate tendency for the plane of rotor disc rotaion to tilt upward at B, although no such movement is involved in the desired pattern of tilting.

Next considering a blade that is approaching R, such a blade will receive a slight and decreasing tendency to rise, followed by an equal tendency to descend as it passes R so that, in addition to the fact that it has imparted to it very little tendency to rise as compared with a blade approaching B, such slight rise as it may receive will be entirely cancelled out by the time it has travelled as far beyond R as it originally stood in the rear of R at the time the pitch change was imposed, but the blade in the vicinity of B continues to climb rapidly as long as it is near B. Similarly, any blade in the vicinity of F will descend rapidly while a blade in the vicinity of L will not be appreciably displaced.

Thus it is apparent that a change in the pattern of pitch distribution designed to cause a resultant leftward tilt of the rotor disc, will if quickly applied, cause an immediate forward tilt instead. The rotation and inertia of the blades will, however, cause the tilt to gradually shift around to the desired direction, for a blade that has climbed upward near B will continue to climb until R is reached and only gradually thereafter will the change of pitch encountered tend to cause it to reverse its movement and descend. Thus gradually the maximum rise occurs in the vicinity of R and the blades travelling from R to F are descending from that maximum raised position to the level of disc 55 (but are still above the level of that disc) instead of descending below the level of that disc as they do when the change of pitch is first introduced.

Therefore, any change of cyclic pitch control that may be suddenly introduced will first cause a tilting of the plane of rotation of the rotor in a direction displaced 90° in a direction opposite to that of rotor rotation from the direction of tilt normally introduced by this change of cyclic pitch if slowly applied, but the direction of tilt will gradually move around in the direction of rotation until it coincides with the direction of tilt that would be normally introduced by a slow control movement.

When the plane of rotation is far removed from that which the rotor tends to eventually assume, the forces and actions which tend to bring it into the eventual plane act rapidly, but as it approaches the eventual plane the restoring movements tend to become more gradual, for when the rotor settles into the plane of rotation which it eventually tends to assume, the tendency for further change of the plane of rotation disappears.

The foregoing description of rotor response to changes of cyclic pitch is somewhat idealized, for as indicated at the outset, we have neglected the effect of airflow due to translational movement of the craft in response to the cyclic changes in pitch (but this develops quite gradually as compared with the blade readjustments mentioned), and have not taken into account in any detail the effects of blade inertia and of changes of lift forces due to changes in angle of attack brought about by the various relative displacements of the blade. However, an effect of the general nature described and following the general pattern of response outlined has been universally observed in the operation of articulated rotor helicopters. The actual pattern of response of a given design may be ascertained either by an extended theoretical analysis taking into full account the factors neglected in the present simplified discussion, or by actual test of a flying embodiment of the design. Both theory and experience indicate that in a helicopter sustained by an articulated rotor there will, in any case, be encountered when any change in cyclic pitch control is suddenly applied, both a relative slowness in securing from the rotor and craft the response normally associated with such change in cyclic pitch, and also an almost immediate but temporary component of rotor response and ensuing craft response at right angles to the normal response.

According to the present invention, the principal object of providing a control system in which the direction of response of the craft to a given control adjustment does not vary, regardless of the rate at which such adjustment is effected, is attained by providing a novel arrangement for adjusting the two coordinate cyclic pitch control elements in response to movement of the principal cyclic control member. As customary in helicopters, the two cyclic pitch control elements referred to are adapted to control the cyclic pitch at respective positions 90° removed from each other. Means are provided for effecting immediate displacement of one of these elements whenever a rapid adjustment of the principal control member takes place, and thereafter automatic devices act to concomitantly restore the displaced element to its normal position and to displace the other pitch control element.

This results in what I call a "gyratory" movement of the universally adjustable pitch control spider in the course of which the axis upon which it is tilted moves angularly about the center of the spider until the final adjustment corresponding to a given adjustment of the main control member is attained.

One embodiment of such a mechanism is illustrated in Figure 3. In Figure 3 a lever 60 is adjustable to effect forward or backward angular displacement of the rotor, while a second lever 61 is adjustable to effect lateral angular displacements of the rotor. These two levers may be connected to a single control stick or other master control element (not shown) by any known arrangement.

Various arrangements are well known in airplane construction for connecting the control stick or other master control member of the craft to one element, displacement of which controls the pitching movements or forward and backward angular displacements of the craft, and to another element, displacement of which controls the rolling movements or lateral angular displacements of the craft, in such a manner that forward or backward displacement of the control member will cause only displacement of the former element and lateral displacement thereof only displacement of the latter element. Such an arrangement may be employed or optionally any other arrangement may be provided whereby the operator may displace lever 60 when he wishes to effect longitudinal control of the craft and lever 61 when he wishes to effect lateral control thereof. As indicated by the arrows respectively labelled F and B in the vicinity of lever 60, upward displacement of this lever is intended to produce forward tilt of the rotor and downward displacement thereof, backward tilt. Also, as indicated by the arrows respectively labelled L and R in the vicinity of lever 61, upward displacement of that lever is intended to produce leftward tilt of the rotor and downward displacement thereof, rightward tilt.

The rods 36 and 37, illustrated in Figure 3, are also shown in Figure 1, and as previously described in connection with that figure, these rods are directly connected to the blade pitch control mechanism in such a manner that upward movement of rod 36 will introduce into the rotor a cyclic change of pitch normally resulting in forward tilt of the rotor, and downward movement of rod 36 will cause an opposite change; while upward movement of rod 37 will introduce into the rotor a cyclic change of pitch normally resulting in leftward tilt of the rotor, and downward movement of rod 37 an opposite change. It is the conventional practice in helicopters to provide a construction which is the equivalent of connecting lever 60 directly to rod 36 and lever 61 directly to rod 37, but in order to secure the advantages of this invention, as hereinbefore outlined, and make it possible to eliminate or minimize the effects of the abnormal response of the rotor to sudden movements of rods 36 and 37 and to overcome the adverse effects due to the slowness of its normal response thereto, I prefer to connect both of the levers 60 and 61 to both of the rods 36 and 37 by means of the novel mechanisms illustrated in Figure 3.

As illustrated in Figure 3, the lever 60 is pivotally connected by a stud 59 to a piston rod 62, which in turn is integral with a piston 63 reciprocable in a hydraulic cylinder 64. Leakage of hydraulic fluid from one side of the piston to the other is provided through a by-pass 65, the flow through which is controlled by a piston 66 which, as more clearly illustrated in Figure 4, is reciprocable in a cylinder 67 which is provided with a bleed hole 68 and contains a spring 69 which presses the piston 66 toward the outer end of the cylinder. The piston and cylinder are constructed so that either there is no appreciable leakage or only a definitely provided amount of leakage aside from that through by-pass 65. Integral with piston 66 is a plunger 70, pressure on the outer end of which may be utilized to selectively position the plunger 66 so as to control the flow through the by-pass 65 to any desired rate of flow. The piston 66 may be provided with special hydraulic sealing means 71 to prevent any hydraulic fluid from passing into the base portion of the cylinder. The by-pass 65 and the flow control cylinder 67 are integrally mounted on the hydraulic cylinder 64 which is movable in the manner hereinafter indicated.

Integral with cylinder 64 is a plate 74, the outline of which is most clearly shown in Figure 5. This plate 74 includes a slot 75 which, as indicated in Figure 3, is arranged to slidably embrace a stud 76 fixed in the frame of the craft. Since the piston rod 62 is constrained to move with respect to the cylinder 64 only along the axis thereof, cylinder 64 is thus guided so as to be free to move only along the line joining the stud 59 on lever 60 to the fixed stud 76. Pivotally mounted on the stud 76 is a link 77, the outline of which is most clearly shown in Figure 6. This link is provided with a slot 78 designed to guide over a stud 79 integrally mounted in the plate 74 (see Figure 3), whereby the link 77 is always held in alignment with the plate 74.

As indicated in Figure 5, the plate 74 is provided with an H-shaped opening 80, while as indicated in Figure 6, the link 77 is provided with an identically shaped opening 81. As indicated in Figure 3, plate 74 and link 77 are normally so positioned as to bring these two openings into registration with each other and a spring 82 is mounted in the openings in such a manner that the upper end of the spring rests against the upper end of both openings and the lower end rests against the lower end of both openings. This causes plate 74 and link 77 to form a two-way yieldable link, which may be either extended or compressed from its normal length, but since one such action will bring the top of opening 81 nearer to the bottom of opening 80, and the other will bring the top of opening 80 nearer to the bottom of opening 81, either extension or compression of the compound link composed of plates 74 and 77 will cause compression of spring 82, and spring 82 will tend to restore the link to its normal length with openings 80 and 81 aligned with each other. If the natural free length of spring 82 is considerably greater than the length of openings 80 and 81, it will exert a strong restoring action upon even slight departure of this compound link from its normal length, and the variation in the strength of restoring action over the entire range of action may be held to a relatively small percentage. The mechanism comprising cylinder 64 and its related mechanism, links 74 and 77 and their related mechanism, all as above described, and including also parts 110 and 116 to be hereinafter described, will for convenience be referred to as a "connecting and regulating unit."

The operations which take place in response to displacement of the lever 60 will now be described. Assume that the end of lever 60 shown in Figure 3 is displaced upwardly to produce a forward tilt of the rotor. If this displacement is made more slowly than the rate at which piston 63 may be displaced in cylinder 64 as governed by the total flow of hydraulic fluid from one side of piston 63 to the other, including the regulated flow through by-pass 65, then cylinder 64 will remain stationary while piston 63 moves upwardly in unison with lever 60. Since under these circumstances plate 74 integral with cylinder 64 remains stationary, and holds stationary a stud 85, integrally mounted in said plate, a lever 86, pivotally mounted on a stud 87 fixed in the frame of the craft and having a slot 88 embracing the stud 85, will also remain stationary, thus holding stationary a link 89 to which it is pivotally attached. The upward movement of lever 60 will, however, be transmitted, through a link 90 to which it is pivotally attached, to a lever 91 to which the link 90 is pivotally attached at 92. The opposite end of lever 91 being pivotally attached to the link 89 by a pin 93 will in the present instance be held stationary, so that lever 91, rocking upward about the pin 93 as a pivot will raise a link 94 which is pivotally attached to the center of the lever 91 by a pin 95. The link 94 in turn is pivotally attached to the left end of a lever 96 by a pin 97. Assuming that there has been no displacement of the lateral control lever 61, a stud 100 (corresponding in the lateral control mechanism to the previously described stud 79 in the longitudinal control mechanism) will be held stationary, holding stationary a lever 101, pivotally mounted on a stud 102 fixed in the frame of the craft. The lever 101, being pivotally connected to a link 103 holds stationary a pin 98 by means of which it is pivotally attached to the lever 96. Hence the raising of the pin 97, through the link 90, lever 91, and link 94, in the manner previously described, will cause lever 96 to rock upward about pin 98 and raise the rod 36 which is pivotally attached to the midpoint of the lever 96 by a pin 99.

As previously described in connection with Figures 1 and 2, this raising of rod 36 will cause simple forward tilting of the rotor if it is raised slowly enough, and according to the present invention the rate of hydraulic flow from one side of piston 63 to the other should be such that if the lever 60 is moved slowly enough to avoid displacement of the cylinder 64 it will necessarily be moved slowly enough to effect simple normal and proportionate forward tilting of the rotor.

On the other hand, if lever 60 is moved upwardly more rapidly than the hydraulic flow permits the piston 63 to be displaced in the cylinder 64 the movement will cause the cylinder 64 to be moved upwardly a distance proportionate to the difference. For instance, assume that lever 60 is given a sudden upward displacement of any given amount. Piston 63 being incapable of any sudden displacement relative to cylinder 64, cylinder 64 will be initially moved upward by the entire amount of such displacement, causing a corresponding amount of compression of spring 82.

which spring immediately starts returning cylinder 64 to its original position as rapidly as the hydraulic flow will permit. Pivotally attached to the plate 74 by means of the pin 79 is a lever 105, the opposite end of which is pivotally attached to a link 106 by a pin 107, which pin is held stationary if there has been no displacement of the lever 61. Pivotally attached to the mid-point of the lever 105 by means of a pin 108 is the rod 37, which as previously described normally controls lateral tilting of the rotor, and which will therefore be moved upwardly in unison with pin 79 and hence in unison with any sudden upward movement of lever 60.

As previously described, if rod 37 is given a quick upward movement such as is thus effected, it will cause an immediate forward tilt of the rotor which forward tilt will gradually disappear coincidentally with the appearance of the leftward normally resulting tilt. Therefore an immediate forward tilting of the rotor due to the sudden upward movement of lever 60 is effected instead of only the gradual forward tilting provided by previous arrangements. Also, with the rate at which the hydraulic flow permits cylinder 64 and pin 79 to return to their normal positions adjusted to at least approximate the rate of disappearance of the abnormal forward tilt of the rotor in response to the sudden upward movement of rod 37, as contemplated by my invention, rod 37 will be returned to normal position as rapidly as its usefulness in providing forward tilting disappears.

Since too rapid a raising of rod 36 in response to any such sudden raising of lever 60 would give an undesired rightward tilt to the rotor, the upward displacement of lever 60 is so arranged to be transmitted to rod 36 at a rate reduced so as to at least approximate the maximum rate that will avoid such a lateral effect. This is accomplished through the lever 86 and link 89, which upon sudden upward movement of lever 60 cause corresponding downward movement of the pin 93, thus cancelling the effect of the immediate upward movement of the pin 92, and causing no immediate upward movement of link 94 and rod 36. However, if lever 60 is held in its upwardly displaced position, the pin 93 will be returned to its original position at a rate determined by the rate of hydraulic flow and the rod 36 will be displaced at this rate, ending up with the same total displacement as in the case of slow movement of the lever 60; for by the time the pin 93 has returned to its normal position all parts are positioned exactly as they would have been in case of slow movement of lever 60.

It will be noted that the displacement of the cylinder 64 and related mechanism as an incident to quick displacement of lever 60, and the return thereof to normal at a controlled rate is made to serve two purposes: acting through lever 86 and link 89 it limits the rate at which rod 36 can respond, holding it to a rate that avoids lateral tilt, while acting through lever 105 and rod 37 it secures an immediate forward response which fades out, accompanied by normalizing of rod 37, approximately as rapidly as the forward response from rod 36 appears.

It will be noted, however, that if the rate at which the hydraulic flow permits return of cylinder 64 to normal position is no greater than the rate which avoids any abnormal response from rod 36, a certain abnormal leftward response will be encountered due to the fact that while rod 37 is being returned to normal and its forward response is disappearing a leftward response to the upward displacement of rod 37 is commencing to assert itself. However, the faster the rate of hydraulic flow permitted the less this leftward response will be, while if the rate is fast enough to cause some abnormal response from rod 36 that abnormal response will be a rightward response. Thus increasing the rate of hydraulic flow will decrease the leftward response and provide a rightward response which increases as the rate increases. Therefore, sufficient increase in the rate of return will give a net rightward response of some degree in addition to the normal forward response, while sufficient decrease in the rate will give a net leftward response. Obviously, therefore, a rate of return can be arrived at which for any given set of conditions will leave no net response either to the right or left. However, the tendency of rod 37 to produce a leftward response appears only gradually during the time that rod 37 is being fed back to neutral and hence the maximum leftward tilt (which in any case will be slight compared to the adverse abnormal effects present in the prior art) will occur near the middle of the feed-back after the leftward effect has had an opportunity to develop and before rod 37 has been returned close to neutral. It will, therefore, be roughly proportional to the time that rod 37 is held out of normal and to the amount of its displacement.

Since the leftward effect on the craft will be somewhat proportional to the amount of tilt multiplied by the time the tilt is present, it is seen that the total leftward effect on the craft will increase rapidly with increase in the displacement of rod 37 by lever 60. In order to correspondingly increase the rightward effect there is preferably included in an embodiment of my invention, means whereby the rate of return is markedly increased with increase in the displacement of rod 37 by lever 60. Since the movement of plate 74 relative to link 77 is a measure of this displacement, I provide means operated by this movement for controlling the rate of hydraulic flow.

This means comprises a cam plate 110, pivotally mounted on the plate 74 by a pin 111, and including a nose 112 embraced in a slot 113 of link 77, so that plate 110 will be angularly positioned on its pivot in accordance with the displacement of the plate 74 and cylinder 64 from their normal positions. Plate 110 is provided with a cam slot 114 which embraces a pin 115 integrally mounted in a lever 116, which in turn is pivotally mounted on the plate 74 by means of the pin 85, and the upper end of which is arranged to engage the plunger 70 and thereby press the piston 66 inwardly to effect the desired regulation of the hydraulic flow.

The desirable shape for the cam slot 114 in order to minimize or avoid responses in an undesired direction will depend upon the characteristics of the particular rotor and craft in eliminating the immediate abnormal response and producing the final normal response to any sudden control movement, and these in turn depend upon such factors as the mass and mass distribution in the blades and the size, shape, airfoil section and twist of the blades, as well as upon the drag of the fuselage when displaced in various directions. However, by experimentation with any given type of craft the proper shape for the slot may be ascertained, the proper procedure being to develop first the central portion of the slot so as to avoid any net lateral response for slight displacements of rod 37, and then to gradually develop the shape outward from the center to avoid such response on correspondingly greater displacements of rod 37. If any part of the slot has too great a rise measured from the pivotal center of plate 110, a net rightward response will be encountered, and for too slight a rise a net leftward response, so that any error in shape can be detected and the proper shape developed.

As shown in Figure 3, the lateral control lever 61 is connected to lateral control rod 37 by mechanism which corresponds exactly to that by which longitudinal control lever 60 is connected to longitudinal control rod 36, as previously described. It will also be seen that lateral control lever 61 is connected to longitudinal control rod 36 by mechanism which corresponds to that by which longitudinal control lever 60 is connected to lateral control lever 37, except for the fact that the connection from lever 61 to rod 36 includes the two levers 96 and 101 connected by link 103 in place of the single lever 105 in the connection from lever 60 to rod 37.

The additional lever 101 is introduced in order to reverse the movement so as to secure the proper 90° displacement relationship between a sudden control movement and the immediate control rod displacement. The latter must be for a control direction displaced 90° in the direction of rotation (in this case counterclockwise) from the direction normally associated with the control lever movement. With the arrangement of Figure 3 it will be noted that a sudden upward movement of lever 60 to control forward tilt, acting through cylinder 64 as previously described, causes immediate upward movement of control rod 37 which is normally associated with leftward tilt or 90° counterclockwise from the forward tilt normally associated with lever 60. Similarly, a sudden upward movement of lever 61 for leftward tilt, acting through the other hydraulic cylinder as a link, and reversing its direction by means of lever 101 causes immediate downward movement of rod 36, which is normally associated with backward tilt or 90° counterclockwise from that normally associated with the control movement imposed by the operator. Similarly, a sudden movement of lever 60 for backward control sets rod 37 for rightward tilt, and a sudden movement of lever 61 for rightward control sets rod 36 for forward tilt, which will be recognized as the proper resulting movement in each case. It is obvious that by reversing the direction of movement related to a given control response in one or more of the members 60, 36, 61 and 37, the need for reversing lever 101 may be eliminated, but that with all four members acting in one plane, as shown, a similar reversing lever will always be required at one or more other points in the system.

In the embodiment disclosed in Figure 3 only one hydraulic cylinder is provided in connection with each of the two coordinate directions of control, and therefore any abnormal displacement of rod 37 in response to a sudden displacement of lever 60 is necessarily neutralized at exactly the same rate that the normal displacement reaches rod 36. However, the time required for an abnormal tilt of the rotor to disappear may only approximate and is not necessarily the same as the time required for the normal tilt to appear, although it is indicated that they are usually of the same general order of magnitude. Furthermore, as we have noted, it is desirable to introduce the normal displacement of the control rods somewhat faster than the rate which will avoid any tendency for abnormal response of the rotor to such displacement, while a slower normalizing of the abnormally displaced rod may permit of taking fuller advantage of the abnormal tilt of the rotor which it produces to augment the early response of the craft in the desired direction, but the more such normalizing is slowed down the more the feeding of the normal response must be speeded up in order to avoid any net response at right angles to the desired control.

For example, referring to the case of a sudden upward displacement of control lever 60, as previously discussed, the rate of normalizing that would be found necessary, as previously outlined, might very likely result in normalizing rod 37 before the forward tilt of the rotor due to the sudden raising of rod 37 had faded out, and therefore it would be possible to get more early forward control by a slower return of rod 37, but since this would give more of a leftward response as the normal response to raising rod 37 asserted itself, it would be necessary to increase the rate at which the normal displacement is fed to rod 36 in order to increase the balancing rightward response. For this reason, I have found that under many circumstances better results can be obtained by controlling the rate at which the displacement of lever 60 is fed to rod 36 independently of the rate at which its displacement of rod 37 is neutralized, and similarly for the connection from control lever 61.

Referring to Figure 7 which illustrates an embodiment of my invention incorporating such an additional refinement, it will be noted that the lever 60 is connected to the rod 37 and that the lever 61 is connected to the rod 36 by mechanisms which correspond exactly to those shown in the embodiment illustrated in Figure 3. However, the connections from the lever 60 to the rod 36 and from the lever 61 to the rod 37 differ from the arrangement disclosed in the Figure 3 embodiment.

In Figure 7, the lever 60 is connected to rod 36 through mechanism which is substantially identical with that which connects it to rod 37, but the mechanism is connected up in the reverse order, the piston rod 62' of the hydraulic cylinder 64' of this assembly being pivoted to the fixed pin 120 and the link 77' of this assembly being pivotally attached to the lever 60 by means of the pin 59. Hence if the lever 60 is given a sudden displacement springs 82 and 82' both collapse while pistons 63 and 63' initially remain substantially fixed in their cylinders 64 and 64', respectively. Therefore, this sudden movement of lever 60 will cause pin 79 to initially move in unison with pin 59, but to return to a fixed distance from the fixed pin 76 at a rate controlled by the rate of hydraulic flow through by-pass 65, which in turn is controlled by cam slot 114; while pin 97 initially remains stationary at a fixed distance from fixed pin 120, but finally moves to its original distance from pin 59 at a rate controlled by the flow through by-pass 65', which in turn is controlled by cam slot 114'.

Hence, as in the previous case of the Figure 3 embodiment, pitch control rod 37 is initially displaced substantially in proportion to any sudden displacement of lever 60 but returned to normal at rates determined by the configuration of slot 114. This slot may be developed so as to complete the return of rod 37 for each displacement in the same length of time that it is experimentally found that it takes the abnormal rotor tilt produced by such displacement of rod 37 to disappear. Similarly rod 36 is gradually brought to a total displacement proportional to that of lever 60 at rates determined by the configuration of slot 114'. This slot may be developed, subsequent to the development of slot 114 in the same manner previously outlined for slot 114 of the Figure 3 embodiment, so as to permit of a rate of return from each displacement which will produce a lateral response exactly counteracting that produced by the corresponding displacement of rod 37.

As also shown in Figure 7, lever 91 is connected to rods 37 and 36 by mechanisms corresponding respectively to those by which lever 60 is connected to rods 36 and 37, except for the introduction of lever 191, which is utilized to reverse the direction of movement transmitted to rod 36 for precisely the same reason as outlined in connection with the lever 101 of the embodiment shown in Figure 3.

By comparing the Figure 3 embodiment with the Figure 7 embodiment it is apparent that the former may be considered as a variation of the latter wherein the upper left and lower right connecting and regulating units of the Figure 7 embodiment are eliminated and replaced by a linkage for displacing rod 36 in proportion to the difference between the movements of pins 59 and 79, and displacing rod 37 in proportion to the difference between the movements of the corresponding pins in the upper right connecting and regulating unit. It is clearly a matter of choice as to which two diagonally opposite connecting and regulating units of the Figure 7 embodiment are eliminated and replaced by a linkage in order to produce the type of embodiment illustrated in Figure 3, for an identically functioning unit would result from retaining the upper left and lower right connecting and regulating units of the Figure 7 embodiment and replacing the other two units by linkages similar to the linkages of Figure 3 and adapted to displace rod 37 in proportion to the difference between the movements of pins 59 and 97, and to displace rod 36 in proportion to the difference between the movements of the corresponding pins in the lower right connecting and regulating unit.

It has thus far been assumed that the transient response is always effected in a direction exactly 90° removed from the direction of the final response. The description of the reasons for this displacement was based on the simplified arrangement wherein the pattern of cyclic blade pitch imposed by the controls is not altered by changes in the flapping angles of the blades, and it was mentioned that this result could be secured by placing the pivotal connection of pitch control arm 20 (Figure 1) to link 21 in line with flapping hinge 13. However, there are certain advantages in having this pivotal connection located outboard from the flapping hinge, as illustrated in Figure 1. It was mentioned that this case would be discussed later.

Referring to Figure 2, we previously noted that when we tilt the plane of the rotor leftward from that represented by disc 55 to that represented by disc 55', the maximum increase in blade pitch occurs at point B. Therefore to impose this new pattern of blade pitch on the rotor the maximum increase of pitch should occur for a blade whose axis extends in the general direction OB.

Referring to Figure 1, we note that the pitch control link 21 stands some distance ahead of the blade axis, and that if the maximum increase in pitch is to be imparted to a blade standing in the position of the blade illustrated in Figure 1, the maximum upward tilt of the pitch control spider 23 must occur along a radius to the point of its pivotal connection to link 21, which radius (as a specific illustration) may, for instance, be advanced 30° rotationally further ahead about the vertical axis of the rotor than the position occupied by the blade. In such an instance, therefore, the spider 23 should be tilted so that its highest point is located 30° ahead of the location of the blade at maximum pitch, which would be 30° ahead of point B (Figure 2), or 60° rotationally behind the direction in which the rotor is to be tilted.

In response to this tilting of spider 23 the rotor disc will commence to swing from the plane of disc 55 (Figure 2) to that of disc 55', which swing will change the pattern of blade pitch unless spider 23 is swung so as to maintain a constant relation to the rotor disc. If the flapping hinges 13 were so located as to intersect the central axis of the rotor, the additional tilt that would have to be imparted to spider 23 by the time that the rotor is swung into the plane of disc 55' would be exactly the same in angle and direction as the angle of tilt separating disc 55' from disc 55. By referring to Figure 1 it will be apparent, however, that if the flapping hinges are located well out from the central axis of the rotor, as illustrated, the flapping movement of the blades will cause less raising and lowering of arm 20, and therefore less tilting of the spider will be required to follow it and compensate for it. If, as illustrated, the flapping hinge 13 is located about half way out from the rotor axis to arm 20, the additional tilt of the spider required to compensate for tilting of the rotor will be approximately half as great an angle as the tilt of the rotor, and its direction will still be the same as that of the rotor tilt. Assuming that, as a typical instance, the distance along arm 20 from the blade axis (central axis of spar 15) to the link 21 is approximately half as great as the radius of spider 23 from the central rotor axis to link 21, then the tilt of spider 23 required to produce a given change in pitch of the blade will be approximately half as great as the change of pitch.

Therefore if we assume a rotor embodying the various typical dimensions mentioned above, to secure a 10° leftward tilt of the rotor would require initially a 5° upward tilt of spider 23 at a location 30° ahead of point B (Figure 2), which, to compensate for the effect of rotor tilt on pitch pattern, will have to be combined with a 5° leftward tilt of spider 23, or upward tilt in line with R. This will result in the maximum upward tilt of the spider occurring at the mean of these two directions of tilt, which would be 60° ahead of point B or 30° back of point R in Figure 2. The blade controlled by this highest point on the spider would be 30° behind the controlling point on the spider or just 30° ahead of point B, or 60° behind the highest point on disc 55'. The immediate transient response will tend to be greatest at this point of greatest tilt of the spider, thus indicating that under these particular conditions the transient response would lag the final response by 60° instead of by 90°, as previously assumed.

While specific arbitrary figures have been employed in the foregoing example, in order to make it easier to visualize the various factors under discussion, the example serves to make clear the desirability of providing structures similar to those of Figure 3 and Figure 7 which will function with any angle of lag of the transient response that may be inherent in the construction of any particular rotor, rather than being designed only for a 90° lag. I have found that this may be accomplished by immediately transmitting a sudden displacement of a control member to its transient response element in proportion to the size of the angle of lag and to its final response element in proportion to the cosine of the angle of lag. Thus if, as previously assumed, the angle of lag is 90° the entire sudden displacement is transmitted to the transient element and none to the final element, which is the manner in which the Figure 3 and Figure 7 mechanism, as previously described, actually act.

However, if the angle of lag were about 63.5°, half as much of any sudden displacement should be immediately fed to the final response element as to the transient response element, and the portion of it thus fed to the final response element should remain there. Figure 8 illustrates the additions which may be made to the mechanism of Figure 7 in order to accomplish this. Most of the mechanism shown in this figure remains as it was shown in Figure 7, and the corresponding parts are numbered the same as in Figure 7. Figure 8 differs from Figure 7 solely in the means for connecting the respective "connecting and regulating units" to the pitch control rods 36 and 37.

In the Figure 8 arrangement movement is imparted to pitch control rod 37 as follows: Pin 125, which pivotally connects lever 61 to the two adjacent connecting and regulating units as previously described, fits in the fork of a lever 126 which is pivotally mounted on the fixed stud 127. Pivotally attached to lever 126 by pin 128 located half way between pins 125 and 127 is a link 129, which is therefore reciprocated vertically in unison with lever 61 and always moves half as much as pin 125. Link 129 is, in turn, pivotally connected by pin 130 to one end of lever 131, the other end of which is pivotally attached by pin 132 to link 133, the lower end of which is pivotally mounted on pin 108, which is the same pin upon which pitch control rod 37 was directly mounted in the Figure 7 arrangement. In that Figure 8 arrangement, however, rod 37 is pivotally mounted on lever 131 by means of pin 134, which is so located that its distance from pin 130 bears to its distance from pin 132 the ratio which corresponds to the tangent of the angle by which the transient response of the rotor lags angularly behind the final response thereof. As previously indicated this angle will generally be less than 90°, in which case pin 134 lies intermediate between pin 130 and pin 132. If the angle of lag were exactly 90°, pin 134 would coincide with pin 132, in which case rod 37 would be vertically positioned directly in accordance with the movement of pin 108, as in the Figure 7 arrangement. Should the angle of lag exceed 90°, pin 134 would be located correspondingly to the left of pin 132, as for instance at the location 135 shown in dotted lines in Figure 8, it being assumed in that case that lever 131 extends far enough to the left to include the location of pin 135.

Pitch control rod 36 is connected to its respective connecting and regulating units in a corresponding manner. Lever 140, pivotally mounted on fixed stud 141 includes at its left end a fork which embraces pin 59 in lever 60. At its midpoint lever 140 is pivotally connected to link 143, which in turn is pivotally attached by pin 144 to the right end of lever 145, the left end of which is pivotally attached by pin 146 to link 147 which is pivotally mounted on pin 99, which is positioned as previously described in connection with Figure 7 wherein pitch control rod 36 was directly mounted on this pin 99. In the Figure 8 arrangement pitch control rod 36 is pivotally mounted on lever 145 by means of stud 148 which is so located that its distance from pin 144 divided by its distance from pin 146 equals the tangent of the angle by which the transient response of the rotor angularly lags the final response thereof.

Referring to Figure 7 it is apparent that any sudden displacement imparted to pin 59 by lever 60 will cause an immediate transient displacement of pitch control rod 37 in an amount initially equalling one-half the movement of pin 59 and a final displacement of pitch control rod 36 also in an amount equalling one-half the movement of pin 59. This two-to-one reduction is the characteristic ratio at which this mechanism transmits the control member movements to the pitch control rods. Exactly the same movements imparted to stud 108 and rod 37 in the Figure 7 arrangement will be imparted to stud 108 and hence to stud 132 in the Figure 8 arrangement. Hence stud 132 will receive a transient displacement equal to one-half of any sudden displacement of stud 59 and also a final displacement corresponding to one half of any displacement of stud 125. Pin 130, however, receives immediately at all times one half the displacement of stud 125. If as a specific instance the angle of lag were about 63.5°, the tangent of which angle is 2.0, pin 134 would be located two-thirds of the way from pin 130 to pin 132, and rod 37 would receive two-thirds the movement of pin 132 plus one-third the movement of pin 130. Similarly, pin 148 would, in that instance, be located two-thirds of the way from pin 144 to pin 146 and pitch control rod 36 would receive two-thirds the movement of pins 99 and 146, and one-third the movement of pin 144.

The response of this mechanism to a typical control operation will now be described. Assume that lever 60 is moved upward suddenly to effect a forward tilt of the rotor. Pin 144 will immediately move up by one-half the movement of pin 59, but pin 146 will not immediately move at all, but will finally also move up by one-half of the movement of pin 59. Therefore pitch control rod 36 will immediately move up by one-third the movement of pin 144, namely, one-sixth the movement of pin 59, and thereafter will gradually move on upward until it has finally moved up by one-half the movement of pin 59. Meanwhile pin 132 immediately receives a transient movement upward of one-half the amount pin 59 moves, while pin 130 does not move at all, thus causing pitch control rod 37 to immediately rise by one-third the movement of pin 59 and to eventually return to its original position. The immediate response to the sudden upward movement of pin 59 is therefore an upward movement of pitch control rod 36 through one-sixth of this distance and of pitch control rod 37 through one-third of this distance. The result will be a tilt of the pitch control spider 23 in a direction intermediate between the separate directions of tilt imparted by these two rods, and since the movement of rod 37 is twice as great as that of rod 36 the direction of tilt will be 63.5° around from the direction of tilt normally associated with forward tilt to that normally associated with left tilt. That is the immediate tilt will be 63.5° in advance of the direction of tilt normally associated with the control exercized. Since the particular dimensions assumed for this example were those proper for a rotor in which the transient response lags the final response by 63.5°, this immediate tilt of the control spider will cause an immediate transient tilt of the rotor 63.5° back from the direction of rotor tilt normally associated with the tilt of the spider. Therefore the immediate rotor responds, being 63.5° back from the direction of spider tilt, which is 63.5° ahead of that normally associated with forward tilt of the rotor, will cause directly forward tilt of the rotor. As the transient response dies out rod 37 returns to normal and rod 36 rises to its full stroke (one-half that of pin 59) thus leaving the final response under sole control of rod 36, as in the previous cases described.

It is to be understood that the particular angle of lag referred to and the other dimensions specifically associated with it are employed only because it is believed that such a typical example it easier to describe and to understand than if this part of the description were given in general terms only. It will be clear that if for a rotor having any other angle of lag the parts were proportioned according to the rules mentioned, the same results will be obtained, namely both a transient response and a final response effective in the direction for which the control was exercised.

I claim:

1. In rotary wing aircraft having a sustaining rotor comprising a plurality of blades, means for altering the pitch of the blades comprising a pitch control ring vertically displaceable to alter the aggregate pitch of all blades and tiltable to introduce cyclic changes of pitch, and a normally vertical hollow tube connected to the rotor for driving same; the combination therewith of an aggregate pitch control member vertically displaceable within said tube and universally connected centrally of said ring to arms integral with the ring extending outwardly through slots in said tube, a second vertically movable member outside said tube, means connecting said member to said aggregate pitch control member so that said two members are constrained to move vertically in unison, two cyclic pitch control members, two levers each jointly positioned by said second vertically movable member and by a respective one of said two cyclic pitch control members, and two pitch control links each connecting a respective one of said levers to said ring to control the tilting thereof.

2. The invention set forth in claim 1, in which the said connecting means comprises one of said two pitch control links, means connecting said link to said second vertically movable member for imparting movement thereto, and another link connecting said ring to said last mentioned means.

3. In a rotary wing aircraft having a frame, a sustaining rotor comprising a plurality of blades and means for altering the pitch of the blades comprising a pitch control ring vertically displaceable to alter the aggregate pitch of all blades and tiltable to introduce cyclic changes of pitch; the combination therewith of aggregate pitch control means including a member universally connected to said ring, two cyclic pitch control members, a lever associated with each cyclic pitch control member and connected to that member, to the aggregate pitch control means, and to an output link so as to move the output link in response to movement of each of the pitch control members connected to the lever, a second lever associated with each of said output links, pivotally mounted on a pivot substantially fixed relatively to the frame of the machine in the direction of rock of said lever, and connected to the output link and to the ring by connections attached to the lever at points whose respective distances from the substantially fixed pivot are proportional to the respective distances along the first mentioned lever from the point of attachment of its connection to the pitch control member to the respective points of attachment of its connections to the output link and to the aggregate pitch control means.

HAROLD T. AVERY.

REFERENCES CITED

The following references are of record in the file of this patent:

UNITED STATES PATENTS

| Number | Name | Date |
|--------|------|------|
| 2,380,582 | Cierva | July 31, 1945 |
| 2,384,516 | Young | Sept. 11, 1945 |
| 2,396,590 | McDougal | Mar. 12, 1946 |
| 2,473,331 | Donley | June 14, 1949 |

OTHER REFERENCES

Ser. No. 254,867, Flettner (A. P. C.), published May 25, 1943.